United States Patent [19]
Salsman

[11] Patent Number: 5,858,551
[45] Date of Patent: Jan. 12, 1999

[54] WATER DISPERSIBLE/REDISPERSIBLE HYDROPHOBIC POLYESTER RESINS AND THEIR APPLICATION IN COATINGS

[75] Inventor: Robert Keith Salsman, Hoschton, Ga.

[73] Assignee: Seydel Research, Inc., Atlanta, Ga.

[21] Appl. No.: 792,635

[22] Filed: Jan. 31, 1997

[51] Int. Cl.$^6$ ............................ B32B 27/06; C08F 283/00
[52] U.S. Cl. ........................... 428/480; 525/437; 525/444; 525/444.5; 428/357; 428/361; 428/364; 428/481
[58] Field of Search ..................................... 525/437, 444, 525/444.5; 428/357, 361, 364, 480, 481; 427/207.1

[56] References Cited

U.S. PATENT DOCUMENTS 5,252,615  10/1993  Rao et al. ............................. 521/48.5

*Primary Examiner*—Samuel A. Acquah
*Attorney, Agent, or Firm*—Isaac Angres; Cort Flint

[57] ABSTRACT

This invention relates to the synthesis from PET (virgin, recycled, post consumer, or precursor raw materials) of novel water dispersible or water emulsifiable polyester resins having improved hydrophobicity or non-polar characteristics. These characteristics give the applied film of these dispersions or emulsions much improved water repellency while at the same time retaining their redispersible or reemulsifiable properties. Such resins can be used for many applications in the paper, textile, coatings, paint, construction, and other industries.

20 Claims, No Drawings

WATER DISPERSIBLE/REDISPERSIBLE HYDROPHOBIC POLYESTER RESINS AND THEIR APPLICATION IN COATINGS

FIELD OF THE INVENTION

This invention relates to the synthesis from polyethylene terephthalate (PET) such as virgin PET, recycled PET, post consumer PET, or precursor raw materials of novel water dispersible or water emulsifiable polyester resins having improved hydrophobicity or non-polar characteristics. The present invention also relates to resins having excellent hydrophobic character, also good ability to orient the hydrophobic groups away from substrates to which they are applied and high water drop contact angles of the coated surface. The above characteristics give the applied film of these dispersions or emulsions much improved water repellency while at the same time retaining their redispersible or reemulsifiable properties. Such resins can be used for many applications in the paper, textile, coatings, paint, construction, and other industries.

BACKGROUND OF THE INVENTION AND DESCRIPTION OF THE PRIOR ART

Several patents have been written relating to the synthesis of water soluble, dispersible, or emulsifiable polyester resins. For example, Altenberg, in U.S. Pat. No. 4,604,410, has proposed making etherified aromatic polyols by digesting scrap polyalkylene terephthalate with a low molecular weight polyhydroxy compound, containing 3–8 hydroxyl groups. A resulting intermediate is alkoxylated with 1–4 moles of ethylene oxide and/or propylene oxide. The final product is useful in making polyurethane and polyisocyanurate foams.

Sperenza et al. U.S. Pat. No. 4,485,196 have recited reacting recycled polyethylene terephthalate scrap with an alkylene oxide, such as propylene oxide. The product can be used in making rigid foams.

Other methods of reacting scrap polyalkylene terephthalate with glycols or polyols are proposed by Svoboda et al. in U.S. Pat. No. 4,048,104; and Altenberg et al. U.S. Pat. No. 4,701,477. In applicant's previous invention (U.S. Pat. No. 4,977,191 to Salsman) there is disclosed a water-soluble or water-dispersible polyester resin suitable for textile sizing applications. The polyester resin comprises a reaction product of 20–50% by weight of waste terephthalate polymer, 10–40% by weight of at least one glycol and 5–25% by weight of at least one oxyalkylated polyol. Preferred compositions also comprise 20–50% by weight of isophthalic acid. A further water-soluble or water-dispersible resin comprises a reaction product of 20–50% by weight of waste terephthalate polymer, 10–50% by weight of at least one glycol and 20–50% by weight of isophthalic acid.

U.S. Pat. No. 5,252,615 to Rao et al teaches coating compositions derived from alcoholysis of polyethylene terephthalate (PET). Most preferably, the PET is recycled or reclaimed from plastic articles.

Dale et al., in U.S. Pat. No. 4,104,222, have proposed making a dispersion of linear polyester resins by mixing linear polyester resin with a higher alcohol/ethylene oxide addition-type surface-active agent, melting the mixture and dispersing the resulting melt in an aqueous alkali solution. The products are used as coating and impregnating agents.

References proposing the use of copolymers containing terephthalic units and units derived from alkylene and polyoxyalkylene glycols for fiber or fabric treatment include Hayes (U.S. Pat. No. 3,939,230), Nicol et al. (U.S. Pat. No. 3,962,152), Wada et al. (U.S. Pat. No. 4,027,346), Nicol (U.S. Pat. No. 4,125,370) and Bauer (U.S. Pat. No. 4,370,143).

Marshall et al., in U.S. Pat. No. 3,814,627, have proposed applying an ester, based on polyethylene glycol, to polyester yarn.

In our other U.S. Pat. No. 5,281,630 (Salsman), we disclose sulfonated water-soluble or water-dispersible polyester resin compositions made by treating a polyester glycolysis product with an alpha, beta-ethylenically unsaturated dicarboxylic acid and then with a sulfite.

The following U.S. patents describe polyester resins containing fatty acid moieties: U.S. Pat. Nos. 4,080,316; 4,179,420; 4,181,638; 4,413,116; 4,497,933; 4,517,334; 4,540,751; 4,555,564; 4,686,275; 5,075,417 and 5,530,059. None of the above patents disclose the resins of the present invention which have excellent hydrophobic and high contact angles when a drop of water is applied to surfaces coated with such resins.

The resins described in the above prior art have found applications in textiles, coatings, and adhesive. All of these resins however have a fairly polar nature which limits their use to adhesion promoters or coating applications where water resistance is not a major factor or where the water resistance is being supplied by other additives. No mention of water repellent properties has been associated with these polyester resins.

In some instances larger amounts of oils are fatty acids are used to supply cross-linking and thermosetting properties to the polyester resins. This chemistry has been labeled "alkyd" chemistry. During the drying phase cross-linking occurs between chains, and the applied coating becomes insoluble.

To this date the inventor has no knowledge of prior polyester art where the water dispersible or emulsifiable polyester resins of said art has incorporated enough non-polar groups to supply hydrophobic character or properties to the substrate on which these dispersions are applied and/or at the same time retain water redispersibility.

The main problem with most non-polar materials that have reactive condensation sites is that these materials have only one reactive site. (For example stearic acid, oleic acid, palmitic acid, behenic acid, etc. These are most likely isolated from naturally occurring triglycerides such as vegetable and animal fats and oils.) This means that in the polyester condensation reaction they become chain terminators and the amounts that can be used are severely limited because the greater the amount the less the molecular weight of the resin. In alkyd chemistry advantage is taken from the unsaturation in oils and cross linking reactions can be used. However reaction through unsaturation does not exposed sufficient areas of the oil modified chain to provide hydrophobic and water repellent properties to the coatings produced from this chemistry.

The resins described in this invention have overcome the problem of chain termination by using a highly modified polyester backbone. In this way polyester resins can be made containing 30 percent or more of monofunctional monomers, such as stearic acid, to provide a much improved non-polar nature. Then, using reactions cited in our previous patents, these resins can be made into water dispersions or emulsions. Because of the large amount of hydrophobic or non-polar functionality these resins cannot be considered water soluble as some previous sulfonated resins have been. When these dispersions or emulsions are applied to most substrates and dried, orientation of the hydrophobic areas of the chain occurs and the surface of the substrate becomes water repellent, with the degree of water repellency corresponding to the thickness and concentration of the initial coating. This water repellency is obvious from the high contact angle of a drop of distilled water placed on the substrate. This high contact angle is not evident in previous water dispersible resins.

The prior art is silent regarding the new water dispersible and polyester resins of the present invention which are derived from polyethylene terephthalate and which exhibits high water repellency as evidenced by high contact angles.

OBJECTS OF THE INVENTION

It is a primary object of the invention to provide water-soluble or water-dispersible polyester resin compositions having improved hydrophobicity.

It is a further object of the invention to provide water-soluble or water-dispersible polyester resin compositions having improved hydrophobicity and non-polar characteristics.

It is an additional object of the invention to provide water-soluble or water-dispersible polyester resin compositions having improved water repellency.

It is yet another object of the invention to provide water-soluble or water-dispersible polyester resin compositions having improved oil and water-repellency.

An additional object of the invention is to utilize waste polyester material in the production of polyester resins having improved hydrophobicity and non-polar characteristics.

It is still another object of the invention to use the water-dispersible polyester compositions as coatings for fiber, paper or fabric.

It is yet a further object of the invention to produce water-soluble or water-dispersible polyester coating compositions having improved oil and water-repellency.

SUMMARY OF THE INVENTION

Briefly, the present invention relates to water dispersible/ and redispersible hydrophobic polyester resins derived typically from PET, especially recycled PET having improved hydrophobicity or non-polar characteristics. The present invention is directed to polyester resins having the following general formula:

$$I_n\text{---}P\text{---}A_m$$

wherein I is the ionic group; n is an integer in the range of 1–3 and defines the number of ionic groups; P is a polyester backbone; A is an aliphatic group; and m is an integer in the range of 3–8 and defines the number of aliphatic groups.

The ionic groups I which are required for water-dispersibility are typically derived from a carboxylic acid group which is introduced into the resin by polyacid monomers The weight percent of ionic monomers in the resin is from 1% to 20% percent, with 5 to 10% of ionic monomer being preferred.

The backbone P of the polymer is composed of polyester groups. It can be any linear or branched polyester made using polyacids and polyalcohols. The preferred method is to generate the backbone using polyester from recycled sources. The weight percent of the polyester backbone ingredients range from 30–80% of the whole resin, with the most preferred being 50–60% by weight.

The aliphatic groups A consist of straight or branched 6–24 carbon chain fatty acids or triglycerides thereof. The weight percent of the aliphatic moiety can be 10–60% with 20–40% by weight being the preferred amount.

The water dispersible and hydrophobic polyester resins of the present invention have excellent water repellent properties as evidenced by their contact angle measurements when used as coatings. The contact angles achieved when the resins are coated on paper are of the order of 98 or higher.

The present invention is also directed to a water dispersible and hydrophobic polyester resin, comprising a reaction product of 30–70% by weight of a terephthalate polymer; 5–40% by weight of a hydroxy functional compound having at least two hydroxyl groups; 1–20% by weight of a carboxy functional compound having at least two carboxyl groups and 10–60% by weight of a compound selected from the group of $C_6$–$C_{24}$ straight chain or branched fatty acid or triglycerides thereof said resin being further characterized in that the hydroxy functional compound is present at 1–3 times the equivalents of the hydrophobic moiety.

The instant invention is also directed to substrates such as paper, paperboard, food packaging, textiles, concrete and the like coated with a polyester resin comprising a reaction product of 30–70% by weight of a terephthalate polymer; 5–40% by weight of a hydroxy functional compound having at least two hydroxyl groups; 1–20% by weight of a carboxy functional compound having at least two carboxyl groups and 10–60% by weight of a hydrophobic compound selected from the group consisting of $C_6$–$C_{24}$ straight chain or branched fatty acid or triglycerides thereof.

The present invention is also directed to an article of manufacture comprising a substrate coated with a water dispersible and hydrophobic polyester coating composition comprising a reaction product of 40–60% by weight of polyethylene terephthalate polymer; 1–10% by weight of neopentylglycol; 5–10% pentaerythritol; 3 to 15% by weight of trimellitic acid or trimellitic anhydride; and 10–45% by weight of stearic acid.

The invention also features a water repellent polyester coating composition, comprising a reaction product of 30–70% by weight of a terephthalate polymer; 5–40% by weight of a hydroxy functional compound having at least two hydroxyl groups; 1–20% by weight of a carboxy functional compound having at least two carboxyl groups and 10–60% by weight of a hydrophobic compound selected from the group consisting of $C_6$–$C_{24}$ straight chain or branched fatty acid or triglycerides thereof Another novel aspect of the invention is a water repellent polyester coating composition, comprising a reaction product of 40–60% by weight of polyethylene terephthalate polymer; 1–10% by weight of neopentylglycol; 5–10% pentaerythritol; 3 to 15% by weight of trimellitic acid or trimellitic anhydride; and 10–45% by weight of stearic acid.

The invention is also directed to a method for imparting water repellency to substrates selected from the group consisting of fibrous substrates and leather comprising applying to such substrates a composition comprising the reaction product of 30–70% by weight of a terephthalate polymer; 5–40% by weight of a hydroxy functional compound having at least two hydroxyl groups; 1–20% by weight of a carboxy functional compound having at least two carboxyl groups and 10–60% by weight of a hydrophobic compound selected from the group consisting of $C_6$–$C_{24}$ straight chain or branched fatty acid or triglycerides thereof.

The invention also describes polyester resins which can be made containing 30 percent or more of monofunctional monomers, such as stearic acid, to provide a much improved non-polar nature.

DETAILED DESCRIPTION OF THE PREFERRED EMBODIMENTS

The objects of the present invention and many of the expected advantages of the present invention will be readily appreciated as the same becomes better understood by reference to the following detailed description.

The novel water dispersible resins of the present invention can be represented as shown by the following structure:

$$I_n-P-A_m$$

where I is the ionic group; n=1–3 defines the number of the ionic groups; P is polyester; A is an aliphatic group; and m=3–8 represents the aliphatic group number.

There are four necessary requirements for the polyester chemistry of the present invention:

1. A polyester backbone.
2. A multifunctional glycol in the backbone providing additional hydroxyl functionality present at 1–3 times the equivalents of group 3.
3. A hydrophobic moiety, such as but not limited to, a saturated fatty acid. This moiety is present at one third to two thirds the equivalents of the number 2 component and must be present in total formula at 10 to 50 weight percent, the preferred level being 15–40 weight percent depending on the needed degree of water repellency.
4. An ionic moiety, either in the backbone or terminally located, present at 5–20 weight percent, the preferred quantity being 10–15 weight percent. This moiety can be neutralized with base if necessary to supply dispersibility in water.

There physical properties that make the resins of the present invention unique are:

1. Hydrophobic character.
2. Ability of these resins to orient the hydrophobic groups away from substrates to which they are applied.
3. Evidence of hydrophobic orientation as characterized by high water drop contact angles of the coated surface.

The water dispersible and hydrophobic polyester compositions of this invention imparts desirable water and oil repellency to substrates treated therewith without adversely affecting other desirable properties of the substrate, such as soft hand (or feeling). The composition of the present invention can be used for providing water and oil repellency to fibrous substrates such as textiles, papers, non-woven articles or leather or to other substrates such as plastic, wood, metals, glass, stone and concrete.

The water-dispersible resins of the present invention are synthesized by condensation polymerization with original or recycled PET or polyacid-polyalcohol [multifunctional acids or alcohols] used to make polyesters along with aliphatic acids or hydrogenated or unhydrogenated animal or vegetable triglycerides.

The water-soluble or water-dispersible resins are made from waste terephthalate polymers, including bottles, sheet material, textile wastes and the like. The waste terephthalate plastics may be bought from recyclers and include, but are not limited to, material identified as "PET rock". The waste terephthalate can be characterized by the unit formula

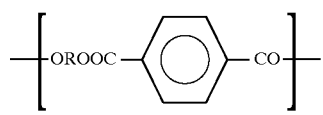

wherein R is the residue of an aliphatic or cycloaliphatic glycol of 2–10 carbons of or oxygenated glycol of the formula $$HO(C_xH_{2x}O)_nC_xH_{2x}OH \tag{2}$$

wherein x is an integer from 2–4 and n is 1–10.

Preferably the waste terephthalate polymer is a polyalkylene terephthalates such as polyethylene terephthalate and polybutylene terephthalate, polycyclohexanedimethanol terephthalate or a mixture thereof. Other suitable polyester polymers which can be used in the practice of the present invention include poly 1,2 and poly 1,3 propylene terephthalate and polyethylene naphthanate. It will be understood that, for reasons of economy, the use of waste terephthalates is preferred. However, the use of virgin terephthalate resins is to be included within the scope of the disclosure and appended claims.

The ionic group $I_n$ needed for water-dispersibility can be a carboxylic acid which is introduced into the resin by polyacid monomers such as Trimellitic anhydride, Trimellitic acid, or Maleic Anhydride or sulfonate groups which come from monomers such as dimethyl 5-sulfoisophthalate (DMSIP or dimethyl 5-sulfo, 1,3-benzenedicarboxylate), sulfoisophthalate ethylene glycol (SIPEG or dihydroxyethyl 5-sulfo 1,3-benzenedicarboxylate, or from sulfonated alkenically unsaturated end groups as described in Salsman Patent No. 5,281,630. The polyacid is preferably selected from the group consisting of isophthalic acid, terephthalic acid, phthalic anhydride (acid), adipic acid and etc. Other preferred polyacids but not limited to are phthalic anhydride (acid), isophthalic and terephthalic acids, adipic acid, fumaric acid, 2,6 naphthalene dicarboxylic acid and glutaric acid. Mixtures of the above acids and anhydrides can be used in the practice of the present invention. The weight percent of ionic monomers in the resin is from 1% to 20% percent, but 5 to 10% is preferred.

The backbone of the polymer is composed of polyester groups. It can be any linear or branched polyester made using polyacids and polyalcohols. The preferred method is to generate the backbone using polyester from recycled sources. The weight percent of the polyester backbone ingredients range from 30–80% of the whole resin, with the most preferred being 50–60%. Such backbone is typically derived by reacting PET such as waste PET with a hydroxy functional compound containing at least two hydroxyl groups. The hydroxy functional compound having at least two hydroxy groups is selected from the group consisting of ethylene glycol, diethylene glycol, triethylene glycol, cyclohexanedimethanol, propylene glycol, 1,2-propylene glycol, 1,3-propane diol, 1,2-butylene glycol, 1,3-butanediol, 1,4-butanediol, neopentyl glycol, 1,5-pentanediol, 1,6-hexanediol, glycerol, trimethylolpropane, trimethylolethane, pentaerythritol, erythritol or a monosaccharide. In another embodiment, other hydroxy compounds having at least two hydroxyl groups include derivatives of glycerol, trimethylolpropane, trimethylolethane, pentaeythritol, erythirtol or a monosaccharide oxyalkylated with 5–30 moles of ethylene oxide, propylene oxide or a mixture thereof, per hydroxyl of the hydroxy functional compound.

The aliphatic groups consist of 6–24 carbon chain fatty acids or triglycerides thereof such as stearic, oleic, palmitic, lauric, linoleic, linolenic, behenic acid or their mixtures. These can come from hydrogenated or unhydrogenated animal or vegetable oil, such as beef tallow, lard, corn oil, soy bean oil, etc., etc. If highly unsaturated fatty acids or triglycerides are used care must be taken to prevent cross-linking through the unsaturated group. The weight percent of the aliphatic moiety can be 10–60% with 20–40% the preferred amount. There are two basic routes to the manufacture of these resins. These routes are outlined below:

Route 1
(1) Aliphatic Acids or Esters+Multifunctional Glycol→Esterification or transesterification= Hydrophobic Glycol
(2) Hydrophobic Glycol+PET (or Diacid with Dialcohol) →esterification or transesterification=Hydrophobic Polyester
(3) Hydrophobic Polyester+Ionic monomer→esterification or transesterification=Water Dispersible and Hydrophobic Polyester Resin Route 2
(1) Diacid or PET+Multifunctional Glycol→esterification or tranesterification =grafting polyester with hydroxyl groups throughout chain and/or as end groups
(2) Grafting polyester+Aliphatic Acids or Esters→esterification or tranesterification=Hydrophobic Polyester Resin
(3) Hydrophobic Polyester+ionic monomer→esterification or transesterification=Water Dispersible and Hydrophobic Polyester Resin The following steps are used in the process to produce the resin of the present invention:

1. Incorporation of a non-polar group or groups which can be chosen from the following: fatty acids of the type stearic acid, behenic acid, palmitic acid, lauric acid, oleic acid, linoleic acid, etc.; triglycerides from animal or vegetable sources of the type beef tallow, corn oil, soybean oil, peanut oil, safflower oil, hydrogenated versions of these, etc.; reactive silicones, blown paraffins or mineral oils, hydrophobic urethanes, etc. This group must be present at 10–50 weight percent.
2. Incorporation by esterification or transesterification of a multifunctional hydroxyl component or components such as pentaerythritol, sorbitol, glycerol, etc. at levels consistent with but not limited to 1 to 3 times the reactive equivalent of components from group 1.
3. Esterification or transesterification of ingredients typical of those used to make polyester polymers. These ingredients can be chosen from Polyethylene Terephthalate or similar terephthalates and/or difunctional acids such as terephthalic acid, isophthalic acid, phthalic acid or anhydride combined with difunctional alcohols such as ethylene glycol, diethylene glycol, neopentyl glycol, propylene glycol, etc.
4. Incorporation of a ionic group or groups needed for dispersing the resin in water. Examples of these groups are trimellitic anhydride, maleic anhydride, sulfo succinate, sulfonated isophthalic acid or its esters, etc.
5. Dispersing the resin in water containing an amount of base, if needed, to neutralize the pendant acid groups.

In practicing the process of the present invention, steps 1–3 can be done in any order but the preferred process embodiment order is as listed above.

The polyester resins are usually and preferably made using an ester-interchange catalyst. These catalysts are metal carboxylates and well known organometallic compounds, particularly compounds of tin or titanium. Preferred catalysts include manganese acetate, sodium acetate, zinc acetate, cobalt acetate or calcium acetate, tetraalkyl titanates, in which the alkyl is of up to 8 carbon atoms, as well as alkyl stannoic acid or dialkyl tin oxides, such as monobutyl stannoic acid or dialkyl tin oxide. Preferred catalysts include monobutyl stannoic acid and tetrapropyl or tetrabutyl titanate, or a mixture thereof.

The resulting resinous products obtained are generally taken up in relatively concentrated aqueous solutions of alkali metal or ammonium hydroxides or carbonates. The concentration employed can be determined by routine experimentation. However, if shipping of the concentrated aqueous solutions to a point of use is contemplated, it is preferred to produce highly concentrated solutions. It is within the scope of this invention to produce initial solutions or dispersions, containing 20–30% or more of resin solids.

The resins of the present invention typically have average molecular weights in the range of 3000 to as high as 50,000. Preferred resins typically have a molecular weight of about 4000 to about 8000. Of course the intended end use will determine which molecular weight will be optimum. The average molecular weight of the resins is typically determined by GPC or by viscosity measurements or other methods well known in the art of polymer chemistry.

EXAMPLES

The following examples are set forth for the purpose of illustrating the invention in more detail. The examples are intended to be illustrative and should not be construed as limiting the invention in any way. All parts, ratios, percentage, etc. in the examples and the rest of the specification, are by weight unless otherwise noted.

Throughout all the Examples described below, a 1000 mL four-neck flask reactor suitable for high temperature cooking is used for the reactions. The flask is equipped with a condenser, a nitrogen inlet, a thermometer, and a stirrer. The chemicals and their ratio are listed as shown in the following examples:

Example 1

| Ingredients | Wt % | Grams |
| --- | --- | --- |
| Recycled PET | 56.29 | 598.8 |
| Pentaerythritol | 6.71 | 71.4 |
| Neopentyl Glycol | 2.6 | 27.7 |
| Tetra Propyl Titanate(TPT) | 0.08 | 0.8 |
| Stearic Acid | 28.24 | 300.4 |
| Monobutyl Stannic Acid | 0.08 | 0.9 |
| Trimellitic Anhydride | 6 | 63.8 |

The PET, pentaerytlritol, neopentyl glycol, and the TPT are added into reactor and heated to 200°–270° C. under a nitrogen blanket. The transesterification reaction takes 30 to 180 minutes and is monitored by the presence of a clear pill. Then stearic acid and monobutyl stannoic acid are added and reacted until the acid value is less than 10. Then Trimellitic Anhydride is added and reacted in at 160–180 degrees Centigrade for thirty minutes. The whole reaction will last for 5 to 12 hours. The obtained resin is dispersed in dilute ammonium solution. The amount of the ammonium hydroxide used depends on the final dispersed resin pH. Using this method a white dispersion or emulsion of the resin is obtained.

Using this solution with or without clay and with or without dye to coat paper or paperboard, a glossy and water repelling surface finish on the paper or paperboard is obtained. The strength of the coated paper or paperboard is increased as well. When the coated paper or paperboard is pulped (stirred vigorously) in a dilute sodium hydroxide solution at room temperature or higher, the resin is removed and redispersed and the paper is repulped nicely.

Example 2

| Ingredients | Wt % | Grams |
| --- | --- | --- |
| Recycled PET | 56.29 | 598.8 |
| Pentaerythritol | 6.71 | 71.4 |
| Neopentyl Glycol | 2.6 | 27.7 |
| Tetra Propyl Titanate(TPT) | 0.08 | 0.8 |
| Oleic Acid/stearic acid | 28.24 | 300.4 |
| Monobutyl Stannic Acid | 0.08 | 0.9 |
| Maleic anhydride | 6.00 | 63.83 |

The PET, pentaerythritol, neopentyl glycol, and the TPT are added into reactor and heated to 200°–270° C. under a nitrogen blanket. The reaction takes 30 to 180 minutes and is monitored by the presence of a clear pill. Then stearic acid and monobutyl stannoic acid are added and the whole is esterified until the acid value is less than 10. Maleic anhydride is added and reacted at 150–180 degrees Centigrade for 15 minutes. The whole reaction will take 5 to 12 hours. The final resin is poured into a sodium sulfite solution in which the amount of sodium sulfite is at same mole ratio, or slightly less than the maleic anhydride. Using this method a white dispersion or emulsion of the resin is obtained. The water-dispersed resin is coated on the paper and paperboard, which leads to the same results as example 1.

Example 3

A recipe containing a triglyceride is shown as follows:

| Ingredients | Weight % | Grams |
| --- | --- | --- |
| Recycled PET | 48.80 | 480 |
| Pentaerythritol | 6.83 | 67.17 |
| Neopentyl Glycol(NPG) | 2.65 | 26.04 |
| Tetra Propyl Titanate(TPT) | 0.08 | 0.8 |
| Hydrogenated Tallow | 24.98 | 245.7 |
| Monobutyl Stannic Acid | 0.08 | 0.8 |
| Trimellitic Anhydride or Maleic Anhydride | 9.83 | 96.67 |
| Isophthalic acid | 6.76 | 66.45 |

The hydrogenated tallow triglycerides are first reacted with pentaerythritol at 180 to 270 degrees Centigrade, then PET, NPG, and TPT are added to the reactor and transesterified with the alcoholized triglyceride. Isophthalic Acid or Phthalic Acid is then added to increase the resin molecular weight. Finally Trimellitic Anhydride or Maleic Anhydride is reacted in to provide a neutralizable end group. With this formula other polyalcohols and polyacids can be used as well. The final resin is diluted in ammonium or sodium sulfite solution at 50 to 90 degrees Centigrade. The final water-dispersed resin is a stable emulsion. The coated paper or paperboard's surface exhibits the same water repellant properties as the previous examples. The board is easily repulped and the coated paper's printing holdout, strength, gloss, and other properties are much improved.

Example 4

In this example the same formula is used as in example 3 except the hydrogenated tallow triglycerides are substituted with corn oil or soy-bean oil. Care must be taken to prevent cross-linking reactions from occurring. The resin properties are similar to those of example 3 except that the presence of unsaturated groups in the oil makes the resin less firm. The coating on paper or paperboard has a slightly higher gloss than those produced with hydrogenated triglycerides.

Example 5

The formula is shown as follows:

| Ingredients | Weight % | Grams |
| --- | --- | --- |
| Pentaerythritol(PE) | 7.07 | 67.7 |
| Neopentyl Glycol | 19.18 | 182.26 |
| Diethylene Glycol | 3.35 | 31.84 |
| Stearic Acid | 24.98 | 245.7 |
| Monobutyl Stannic Acid | 0.1 | 0.96 |
| Trimellitic Anhydride(TMA) or Maleic Anhydride(MA) | 10.17 | 96.67 |
| Isophthalic acid | 34.27 | 325.64 |

The Stearic acid, the Monobutyl Stannoic Acid, and the Pentaerythritol are added to the vessel and reacted at 160 to 270 degree C. until the acid value is less than 100. The Isophthalic acid, the Neopentyl Glycol, and the Diethylene Glycol are added to reactor and the polymerization is continued until the acid value is below 10. Finally the TMA or MA is added at a reduced temperature to ensure control. The final resin is dispersed in ammonium or sodium sulfite solution as in previous examples. The resin dispersion has the appearance of a stable emulsion. The coated paper or paperboard shows great water repelling properties. The gloss also is increased for coated papers.

Example 6

The same formula is used as in example 5 except the Isophthalic acid is replaced with Terephthalic acid with the same results.

Example 7

The same formula is used as in example 5 except the Isophthalic is replaced with Phthalic acid with similar results.

Example 8

The formula is shown as follows:

| Ingredients | Weight % | Grams |
| --- | --- | --- |
| Pentaerythritol(PE) | 7.07 | 67.7 |
| Neopentyl Glycol | 19.18 | 182.26 |
| Diethylene Glycol | 3.35 | 31.84 |
| Stearic Acid | 24.98 | 245.7 |
| Monobutyl Stannic Acid | 0.1 | 0.96 |
| Trimellitic Anhydride(TMA) or Maleic Anhydride(MA) | 10.17 | 96.67 |
| Phthalic acid | 34.27 | 325.64 |

The Stearic acid, the Monobutyl Stannoic Acid, and the Pentaerythritol are added to the vessel and reacted at 160 to 270 degree C. until the acid value is less than 100. The Phthalic acid, the Neopentyl Glycol, and the Diethylene Glycol are added to reactor and the polymerization is continued until the acid value is below 10. Finally the TMA or MA is added at a reduced temperature to ensure control. The final resin is dispersed in ammonium or sodium sulfite solution as in previous examples. The resin dispersion has the appearance of a stable emulsion. The coated paper or paperboard shows great water repelling properties. The gloss also is increased for coated papers.

Example 9

The same formula is use as in example 5 except the TMA or MA is replaced with DMSIP or SIPEG and reacted as a polyacid or polyalcohol. A good water-dispersible resin is obtained and the resin shows similar properties as described above.

The novel water dispersible and hydrophobic polyester resins of the present invention can be used to coat substrates such as cellulosic or synthetic substrates such as paper. More in particular, the polyester resins find use as coatings in the following industrial applications:

I. PAPER

Because these resins contain a high concentration of hydrophobic groups and have a much improved ability to orient those hydrophobic groups away from the paper or paperboard, the surface of paper or paperboard coated with these resins shows an amazing water repelling effect. This water repelling effect produces surfaces that have higher water drop contact angles than other currently used resins. Therefore these resins can effectively make the paper or paperboard surface waterproof or water repellent at much lower concentrations than other commonly used resins. In addition the resins described here can be easily removed from the paper, paperboard, or other substrate by washing with water that has been made basic by the addition of ammonium hydroxide, sodium hydroxide, or other commonly used basic additives. The advantages for using these resins in the paper and paperboard industry are threefold. One advantage is in the use of lesser amounts of materials on the paper of paperboard, a second advantage is the recycling of waste PET (possibly from bottle sources) back into packaging materials, and the third advantage is that all materials coated in this manner can be easily repulped and therefore recycled. In connection with paper coating applications, the following are particularly preferred:

A. Paper or paperboard for food packaging

Some food packages (fresh produce, frozen goods, dry food, dairy products, etc.) need high hydrophobic properties of the package box surface to ensure package shelf-life under high moisture conditions. In addition to plastic packages, coated paper or paperboard is commonly used. The coating on this paper or paperboard is generally very hydrophobic. The resins most widely used in paper or paperboard coatings are the mixture of polyethylene vinyl acetate copolymers (usually referred to as EVA for ethylene vinyl acetate) in combination with paraffin wax. This type of coating system produces hydrophobic coatings which are water insoluble and therefore very difficult to remove from the paper or paperboard during repulping. This difficulty in repulping inhibits easy recycling of these paper products. The resins described in this invention are easily repulped using basic additives as described above.

The resins described in this invention are composed of raw materials that have a reputation of being generally regarded as safe and non-toxic. This fact along with the great need for water repellent coatings in the paper industry for food packaging etc., and the inexpensive nature of these resins which may be produced from recycled PET, make these resins highly desirable for coating paper or paperboard intended for food packaging.

In the Frozen Food Industry paper containers are used to store food for use in instant cooking, microwave ovens. These containers must be moisture resistant to handle the freezing and thawing conditions they are subjected to. The disclosed resins, because of their FDA status for food contact, would be ideal candidates for the protection of these paper containers.

B. Printing Paper

Paper intended for printing or magazine paper has a coating that consists of Styrene Butadiene Rubber latex (SBR), polyvinyl acetate latex, rosin and/or other materials such as clay and starch. The coating is used to impart properties such as surface smoothness, strength, gloss, ink holdout, and water resistance. The new resins disclosed in this patent can also be used to impart these properties at lower coating weights. For example printing paper coated with these resins alone have excellent water repellency and ink holdout as well as increased strength and gloss.

C. Paper or Paperboard for storage or transport

Paper Bags for carrying consumer purchases, etc. have a problem in that if they get wet they lose their strength and tear easily. Making these bags water repellent or just water resistant would help solve this problem. Letters, envelopes, and courier packages need waterproofing to keep the contents dry during mailing or shipping. Envelopes or packaging board coated with these disclosed resins provide sufficient protection.

D. Release Paper

Release coatings are used where an adhesive material needs to hold to a surface but not so much that it tears the surface when pulled from it. Currently silicones are used for this purpose. The resins described here can be used for this purpose as well since the hydrophobic properties make them ideally suited as adhesive release agents.

E. Miscellaneous Paper Items

Other paper products which could benefit from an inexpensive waterproofing system would be fiber drums, book and notebook covers, popcorn bags, paper plates, paper cups, paper rainwear such as disposable clothing, paper construction materials (wallpaper, dry wall, sound board, or concrete construction forms), and any other outdoor use paper product that could be damaged by rain, rainwater, or high moisture conditions.

II. TEXTILES

In the textile industry there are several needs for waterproofing or water resistant finishes. The currently used resins can be expensive and difficult to apply. The resins described here can find applications in a number of areas in the textile industry. Some of these areas of application include: Fiber or Thread Finishes, clothing or apparel in general, tarps, rainwear, non-wovens, nylon microdenier fabrics, bedding, mail bags, reapplication of waterproofing agents and footwear.

III. WOOD

Wood products especially those used in outdoor applications, need to be protected from rain and weather. The resins described here can be used to waterproof wood products. Some examples of wood products where the described resins could be applied are: Furniture, wood decks, construction lumber, plywood, wood for concrete molds, siding for houses, telephone poles, roofing tiles, paneling for interior walls, wooden crates and boxes for shipping and storing, and wooden boats or boat parts.

IV. CONCRETE

It is desirable in some concrete applications for there to be a sealer or water resistant finish applied to the concrete after it has set. This finish provides increased durability and longer life of the concrete surface as well as allowing rain water to run off more effectively. The products described in this invention can be used for this purpose. Some examples are: Overpasses and bridges on roads, high traffic areas such as stadium decks, Etc., outdoor stadium seats, driveways, roadways and concrete housing.

V. PAINT

In some instances it is desirable for a paint (or protective coating) to exhibit a certain amount of water repellency. Some examples are: Traffic Paint—to replace currently used solvent based alkyd resins and general purpose Latex. In the case of the latex, the inventive resins can be used as additives

VI. LEATHER

Leather products can be treated for water repellency. Here the added gloss would also be desirable. Typical leather products include shoes, handbags, coats and gloves.

VII. INKS

In the ink market resins are used to adhere the ink to some substrate. Once dry they must be moisture and abrasion resistant. Many currently used resins are water based. The described resins here would make ideal candidates as ink resins or additives since the resins are very adhesive, especially to cellulosics, and once dry would be very water resistant.

VIII. GLASS

Fiberglass is used as the structural material for a great deal of commonly used items such as shower stalls, boats, kitchen and bathroom sinks. The described resin could be used as part of the formulation to make these products repel water more effectively. The dispersions of this invention could also be used to treat the glass fibers themselves, as in sizing, for greater water repellency or greater resin solubility.

IX. METAL COATINGS

Metal coils are commonly coated with a resin to prevent rust or oxidation caused by moisture in the air. The currently used products are generally resins dissolved in some solvent. The resins described here could be used as replacements for these coatings. Cars, gutters and appliances may be coated with the resins of the present invention.

The amount of the composition applied to a substrate in accordance with the present invention is chosen so that sufficiently high or desirable water and oil repellencies are imparted to the substrate surface, said amount usually being such that 0.01% to 10% by weight, preferably 0.05 to 5% by weight, based on the weight of the substrate, of polyester is present on the treated substrate. The amount which is sufficient to impart desired repellency can be determined empirically and can be increased as necessary or desired.

The treatment of fibrous substrates using the water and oil repellency imparting composition of the present invention is carried out by using well-known methods including dipping, spraying, padding, knife coating, and roll coating. Drying of the substrate is done at 120° C. or below, including room temperature, e.g., about 20° C. with optionally heat-treating the textile products in the same manner as in conventional textile processing methods.

The effectiveness of the coatings resulting from the resins of the present invention is illustrated in Example 10.

Example 10

Contact Angle Comparisons

The following example illustrates the effectiveness of applicant's polyester resins as water repellent coatings for paper or paperboard. The test was performed using a Kernco Model G-I Contact Angle Goniometer used to measure the contact angles between the surface of a piece of paper or paperboard and a drop of distilled water placed on the paper.

PROCEDURE

A 0.1 ml sample of distilled water was place on the surface of a piece of uncoated(control) and coated paperboard using a micro syringe. The initial angle of the drop to the paperboard surface was taken. A time of 5 minutes was allowed to elapse and a second contact angle was taken. The test was performed ten times and the average values calculated. The difference between the two average values was calculated as the Lose of Angle.

RESULTS

The following chart reflects the results using uncoated paper and various coating formulas.

| TEST SAMPLE | Initial Angle | 5 min. Angle | Lose of Angle |
|---|---|---|---|
| Control: No coating | 78.2 | 64.3 | 13.9 |
| Graphsize: polyurethane size | 91.3 | 84.4 | 6.9 |
| PE-230: Hydrophilic polyester size | 68.5 | 52.7 | 15.8 |
| LB-100(30%): Eastman polyester | 68.0 | 53.3 | 14.7 |
| Styrene Maleic Polymer | 95.0 | 77.7 | 17.3 |
| 2161: XWP with 43.17% Fatty acid | 110.3 | N/D | N/D |
| 2160: XWP with 37.94% Fatty acid | 112.0 | 103.8 | 8.2 |
| 2148: XWP with 28.82% Fatty acid | 107.5 | N/D | N/D |
| 2141: XWP with 25.86% Fatty acid | 104.3 | 96.6 | 7.7 |
| 2180: XWP with 20.00% Fatty acid | 102.0 | 94.3 | 7.7 |
| 2086: XWP with 15.00% Fatty acid | 98.8 | 81.0 | 17.8 |

In the table above, the resin compositions of the invention are defined as follows:

Resin 2161: This resin is the reaction product of: 38.57 wt % PET, 43.17 wt % fatty acid (6.50 wt % stearic; 10.22 wt % oleic and 26.45 wt % hydrogenated tallow glyceride), 8.10 wt % pentaerythritol and 10 wt % trimellitic anhydride.

Resin 2160: This resin is the reaction product of: 42.84 wt % PET, 37.94 wt % fatty acid (18.97 wt % stearic and 18.97 wt % hydrogenated tallow glyceride), 9.08 wt % pentaerythritol and 9.96 wt % trimellitic anhydride.

Resin 2148: This resin is the reaction product of: 48.08 wt % PET, 28.82 wt % fatty acid (14.41 wt % stearic acid and 14.41 wt % soybean oil), 6.89 wt % pentaerythritol, 2.58 wt % neopentylglycol, 9.96 wt % trimellitic anhydride and 3.68 wt % isophthalic acid.

Resin 2141: This resin is the reaction product of: 34.27 wt % isophthalic acid, 25.86 wt % stearic acid, 7.07 wt % pentaerythritol, 19.18 wt % neopentylglycol, 3.35 wt % diethyleneglycol and 10.17 wt % trimellitic anhydride.

Resin 2180: This resin is the reaction product of: 61.72 wt % PET, 20.00 wt % stearic acid, 4.75 wt % pentaerythritol, 2.46 wt % neopentylglycol, 0.91 wt % diethyleneglycol, 10.00 wt % trimellitic anhydride.

Resin 2086: This resin is the reaction product of: 74.90 wt % PET, 15.00 wt % stearic acid, 4.50 wt % pentaerythritol, 3.47 wt % neopentylglycol, 1.96 wt % diethyleneglycol.

The physical properties that make this resin unique are:
1. Hydrophobic character.
2. Ability of these resins to orient the hydrophobic groups away from substrates to which they are applied.
3. Evidence of hydrophobic orientation as characterized by high water drop contact angles of the coated surface.

It will be apparent from the foregoing that many other variations and modifications may be made regarding the hydrophobic polyester resins described herein, without departing substantially from the essential features and concepts of the present invention. Accordingly, it should be clearly understood that the forms of the inventions described herein are exemplary only and are not intended as limitations on the scope of the present invention as defined in the appended claims.

What is claimed is:

1. A water dispersible and hydrophobic polyester resin having the formula:

$$I_n\text{—}P\text{—}A_m$$

wherein I is an ionic group; n=1–3 is the number of ionic groups; P is a polyester backbone; A is a fatty aliphatic group; m=3–8 is the number of fatty aliphatic groups and wherein I is present in amount of from about 1% to 20% by weight; the polyester backbone is present in an amount of from about 30% to 80% by weight and the fatty aliphatic group is present in an amount of about 10% to 60% by weight; said polyester resins exhibiting high water repellency as shown by an initial contact angle of at least 98 when a drop of water is applied to the surface of a cellulosic substrate which has been coated with said resin.

2. The water dispersible and hydrophobic polyester resin of claim 1 wherein I is present in an amount ranging from 5% to 10% by weight.

3. The water dispersible and hydrophobic polyester resin of claim 1 wherein the polyester backbone P is present in an amount ranging from 50% to 60% by weight.

4. The water dispersible and hydrophobic polyester resin of claim 1 wherein the fatty acid group A is present in an amount ranging from 20% to 40% by weight.

5. The water dispersible and hydrophobic polyester resin of claim 1 wherein I is derived from polycarboxylic acid or anhydrides selected from the group consisting of trimellitic anhydride, trimellitic acid and maleic anhydride.

6. The water dispersible and hydrophobic polyester resin of claim 1 wherein the polyester backbone P is a polyalkylene terephthalate selected from the group consisting of polyethylene terephthalate, polypropylene terephthalate and polybutylene terephthalate.

7. The water dispersible and hydrophobic polyester resin of claim 1 wherein the fatty acid group A is selected from the group consisting of stearic acid, behenic acid, palmitic acid, lauric acid, oleic acid and linoleic acid.

8. A water dispersible and hydrophobic polyester resin, comprising a reaction product of 30–70% by weight of a terephthalate polymer; 5–40% by weight of a hydroxy functional compound having at least two hydroxyl groups; 1–20% by weight of a carboxy functional compound having at least two carboxyl groups and 10–60% by weight of a hydrophobic compound selected from the group consisting of $C_6$–$C_{24}$ straight chain or branched fatty acid or triglycerides thereof; said resin being further characterized in that the hydroxy functional compound is present at 1–3 times the equivalents of the hydrophobic moiety.

9. The water dispersible and hydrophobic polyester resin of claim 8, comprising the reaction product of waste terephthalate of the unit formula

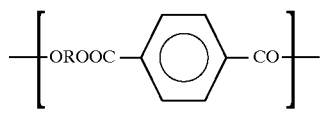

wherein R is the residue of an aliphatic or cycloaliphatic glycol of 2–10 carbons of or oxygenated glycol of the formula $$HO(C_xH_{2x}O)_nC_xH_{2x}OH \qquad (2)$$

wherein x is an integer from 2–4 and n is 1–10.

10. The water dispersible and hydrophobic polyester resin of claim 8, wherein the waste terephthalate polymer is polyethylene terephthalate, poly 1,2 propylene terephthalate, poly 1,3 propylene terephthalate, polybutylene terephthalate, poly(cyclohexanedimethanol terephthalate) or a mixture thereof.

11. The water dispersible and hydrophobic polyester resin of claim 8, wherein said hydroxy functional compound having at least two hydroxyl groups is selected from the group consisting of ethylene glycol, diethylene glycol, triethylene glycol, cyclohexanedimethanol, propylene glycol, 1,2-propylene glycol, 1,3-propane diol, 1,2-butylene glycol, 1,3-butanediol, 1,4-butanediol, neopentyl glycol, 1,5-pentanediol, 1,6-hexanediol, glycerol, trimethylolpropane, trimethylolethane, pentaerythritol, erythritol and a monosaccharide.

12. The water dispersible and hydrophobic polyester resin of claim 8, wherein said hydroxy functional compound having at least two hydroxyl groups is selected from the group consisting of derivatives of glycerol, trimethylolpropane, trimethylolethane, pentaerythritol, erythritol and a monosaccharide oxyalkylated with 5–30 moles of ethylene oxide, propylene oxide or a mixture thereof, per hydroxyl of the hydroxy functional compound.

13. The water dispersible and hydrophobic polyester resin of claim 8, wherein said carboxy functional compound having at least two carboxyl groups is selected from the group consisting of trimellitic acid, trimellitic anhydride, maleic acid, maleic anhydride, fumaric acid and isophthalic acid.

14. The water dispersible and hydrophobic polyester resin of claim 8, wherein said hydrophobic compound is selected from the group consisting of stearic acid, oleic acid, linoleic acid, behenic acid, lauric acid, palmitic acid, beef tallow, lard, corn oil and soybean oil.

15. The water dispersible and hydrophobic polyester resin of claim 8, comprising the reaction product of 40–60% by weight of polyethylene terephthalate polymer; 1–10% by weight of neopentylglycol; 5–10% pentaerythritol; 3 to 15% by weight of trimellitic acid or trimellitic anhydride; and 10–45% by weight of stearic acid.

16. The water dispersible and hydrophobic polyester resin of claim 8, comprising a reaction product prepared in the presence of monobutyl stannoic acid or a tetraalkyl titanate, or a mixture thereof.

17. The water dispersible and hydrophobic polyester resin of claim 8, dispersed in water with an alkali metal or ammonium hydroxide or carbonate.

18. The water dispersible and hydrophobic polyester resin of claim 15, dispersed in water with an alkali metal or ammonium hydroxide or carbonate.

19. A water repellent polyester coating composition, comprising a reaction product of 30–70% by weight of a terephthalate polymer; 5–40% by weight of a hydroxy functional compound having at least two hydroxyl groups;

1–20% by weight of a carboxy functional compound having at least two carboxyl groups and 10–60% by weight of a hydrophobic compound selected from the group consisting of $C_6$–$C_{24}$ straight chain and branched fatty acid and triglycerides thereof said polyester coating exhibiting high water repellency as shown by an initial contact angle of at least 98 when a drop of water is applied to the surface of a cellulosic substrate which has been coated with said polyester coating.

20. A water repellent polyester coating composition, comprising a reaction product of 40–60% by weight of polyethylene terephthalate polymer; 1–10% by weight of neopentylglycol; 5–10% pentaerythritol; 3 to 15% by weight of trimellitic acid or trimellitic anhydride; and 10–45% by weight of stearic acid said polyester coating exhibiting high water repellency as shown by an initial contact angle of at least 98 when a drop of water is applied to the surface of a cellulosic substrate which has been coated with said polyester coating.

* * * * *